UNITED STATES PATENT OFFICE.

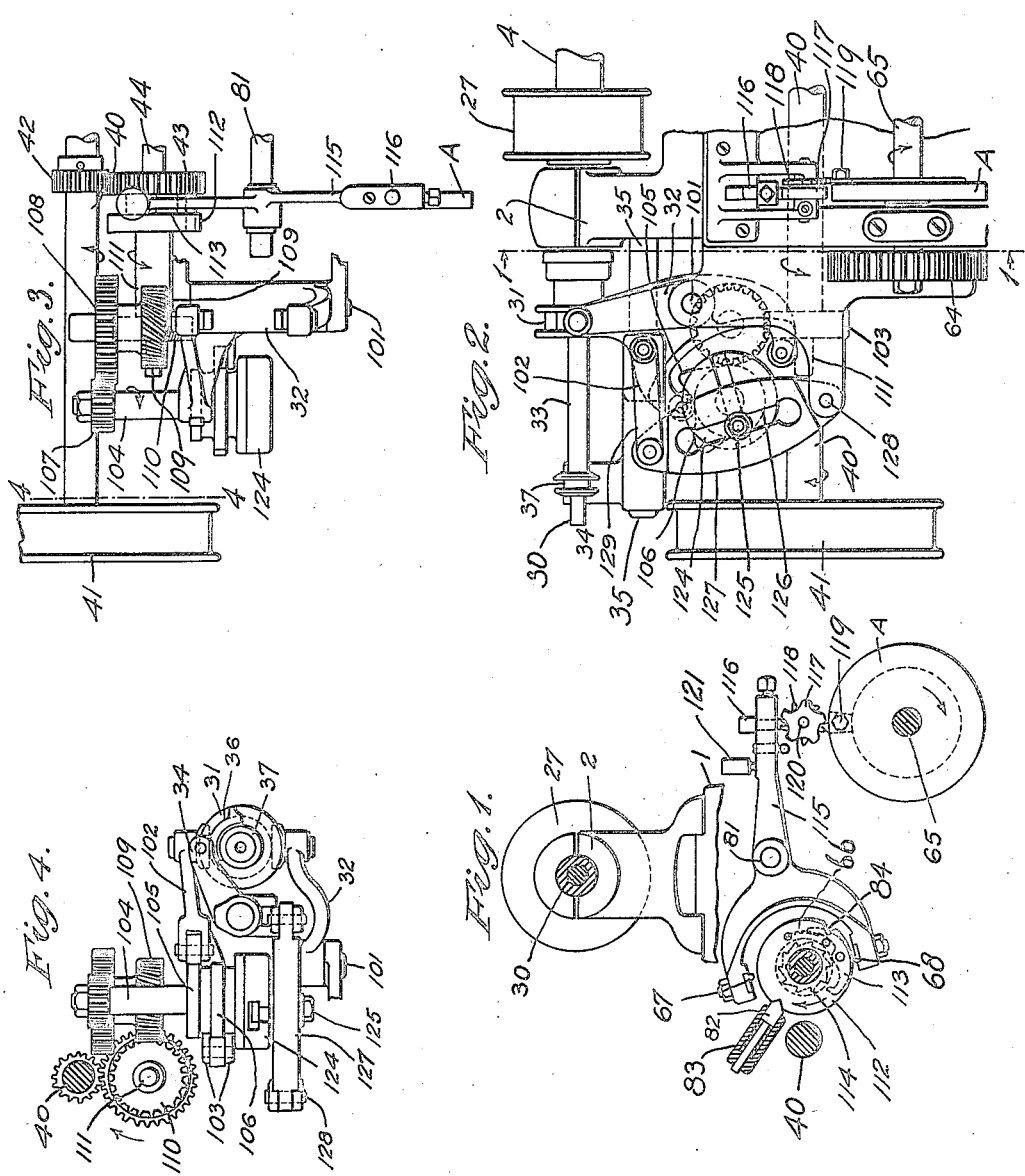

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-SCREW MACHINE.

1,140,323. Specification of Letters Patent. Patented May 18, 1915.

Original application filed April 7, 1910, Serial No. 553,965. Divided and this application filed April 25, 1914. Serial No. 834,321.

*To all whom it may concern:*

Be it known that I, BENGT M. W. HANSON, a citizen of the United States, residing at Hartford, in the county of Hartford and State of Connecticut, have invented new and useful Improvements in Metal-Screw Machines, of which the following is a specification.

This invention comprises improved means for gripping and feeding forward the stock or material employed in various kinds of machines.

It is herein shown and described as applied to machines of the type now generally known as automatic screw machines, for making metal screws, studs, pins, and similar articles. In such machines a rod of stock is gripped by a chuck carried in a revolving spindle with a suitable length of the rod projecting beyond the spindle to be operated upon by suitable tools. As each piece is completed, it is severed from the rod of stock, the chuck is loosened to release the rod, the rod is fed forward to project the new end a proper distance, the chuck is again closed, the new length is operated upon by the tools, and so on, this succession of operations being automatically repeated on the rod until it is all used up, when it is replaced by a new rod.

This application is a division of my earlier application Serial No. 553,965, filed April 7, 1910.

Figure 1 of the drawings is an end elevation partly in section taken on the line 1—1 of Fig. 2. Fig. 2 is a front elevation. Fig. 3 is a plan view projected from Fig. 2, and Fig. 4 is an end view projected from Fig. 3, the shaft 40 being shown in section taken on the line 4—4.

The main or work-carrying spindle 4 is mounted in the head 2, and is arranged to be driven by the pulley 27 by a suitable belt from any convenient countershaft. The rod of stock 30 to be operated upon is gripped by any suitable and well-known chuck or collet mechanism carried by the main spindle 4 and operated through the collar 31 by means of the yoke 32, which is moved at proper times to open and close the chuck or collet by mechanism to be hereinafter described. When the chuck is opened or loosened the rod of stock 30 is fed forward by means of a feed tube 33 of any suitable or well-known construction which is connected with a feed slide 34 mounted on the stud 35 projecting from the head 2. The slide 34 is provided with a dog 36, which is hinged to the feed slide 34 and fits in a groove collar 37 of the feed tube 35, this hinged construction permitting the dog to be swung out of the groove when it is desired to withdraw the feed tube 33.

The main driving shaft 40 rotates in bearings on the bed 1 and is provided with a pulley 41, which is driven by a belt from any convenient motor or shaft. The shaft 40 rotates continuously and has fixed upon it the gear 42 driving the gear 43 on the shaft 44, thus furnishing constantly running power for driving the intermittently operating mechanism shown in the figures for opening and closing the chuck in the main spindle 4, and feeding forward the rod of work 30 to be operated upon.

The driving shaft 40 and the gears 42 and 43 are proportioned and driven so as to impart to the mechanism here shown a speed suitably adapted and related to the other mechanisms of the machine with which it is employed. A control shaft 65 also journaled on the bed of the machine is driven by suitable connections, as for example through the gear 64 at a speed in accordance with the speed relation to be maintained between the respective mechanisms. In the present instance, the shaft 65 is assumed to make one rotation for each operation of the chuck operating and feeding mechanism here described. A control disk A carried by the shaft 65 is provided with dogs or tappets 119 seated in guides or slots extending circumferentially around the disks, so that one or more of the tappets 19 may be adjusted and clamped at proper positions for starting the mechanism here described.

The collar 31 is appurtenant to a sleeve, which extends through the main spindle 4 and operates a chuck or collet within that spindle or at its front end in any well-known way, by the longitudinal movement of the collar and sleeve, that longitudinal movement being imparted by the yoke 32, which is pivotally mounted at 101, on the bed or framing, and is provided with cam arms 102 and 103, which extend in different planes on opposite sides of the cam shaft 104, and engage with different cams thereon, the arm 102 engaging with the cam 105, and the arm 103 engaging with the cam 106, preferably using the customary antifriction rollers. The two cams 105 and 106 are of contours suited for rocking the yoke 32 at suitable times and to the extent needed for opening and closing the chuck, leaving the arms free at the resting positions of the cams as shown in Fig. 2, to allow the chuck to be opened and closed by hand, it being sometimes desirable to remove the work for examination before cutting it from the rod.

The cam shaft 104 is mounted in suitable bearings in the bed, and is provided with a gear 107 meshing with the gear 108, which in turn is driven by a pair of spiral gears 109 and 110. The latter gear is mounted on the shaft 111, which is supported in suitable bearings, and is driven by any well-known single revolution or half-revolution clutch or other driving device. This device is illustrated herein for imparting periodic half-revolutions to the shaft 111 and to the mechanism driven by it, under the control of devices carried by the controlling shaft 65 which is journaled on the bed and driven through the gear 64 from the machine with which the present invention may be employed, so as to operate the clutch and feeding devices of this invention in suitable time relation to the rest of that machine.

The shaft 111 has secured upon it the flange 112, upon which is pivotally mounted a dog 113 overlying a constantly rotating driving ratchet 114 carried by the side of the gear 43. The shaft 111 is in axial alinement with the gear 43, and the ratchet 114, so that the shaft 112 is carried around by the ratchet when the driving dog 113 engages the teeth of the ratchet. The dog is pressed into engagement with the teeth of the ratchet by means of the spring 66 carried by the flange 112. To stop the shaft 111 the dog is withdrawn from the ratchet teeth by colliding with the detents 67 and 68 of the control lever 115, which is pivotally mounted on the stud 81 supported by the bed of the machine. Thus the detent ends of the lever 115 coöperate with the dog 113 as an escapement, permitting the dog, its flange 112, and the shaft 111, to make half a revolution each time that the control lever 115 is moved first in one direction and then in the other, by an oscillatory movement. A pawl 82 mounted in any convenient bracket is pressed by means of the spring 83 into engagement with the flange 112, and at the stopping positions of that flange engages with the oppositely disposed notches 84 in the edge of the flange to prevent holding the flange in its two stopping positions when its dog is released from the ratchet wheel by one or the other of its detents 67 and 68.

The control lever 115 is oscillated upon the stud 81, for the performance of its escapement movements, by means of a cam 117 turning on the fixed shaft or stud 120. A cam pin 116 secured in the arm 115 bears against the circumferential edge of the cam 117 which is lobed or toothed so as to alternately raise and lower the adjacent end of the arm 115 as the cam pin rides over the lobes of the cam. A spring-pressed plunger or presser 121 bears upon the top of the arm 115, holding the cam pin 116 into contact with the lobes of the cam 117. That cam is turned intermittently by means of a tappet 119 adjustably secured to the control disk A and acting upon a star wheel 118 secured to the side of the cam 117. Any desired number of these tappets may be employed so as to advance the cam 117 and thus actuate the escapement, as many times in the rotation of the control disk A as may be desired. In the present instance only one tappet is shown. Each tappet as it engages with the star wheel 118 turns the cam far enough to bring the cam pin 116 from its lowest position to its highest position, or vice versa, the cam pin thus coming to rest first upon the top of a lobe, and then at the bottom of the next depression. Each upward movement of the cam pin releases the detent 68 from the dog 113 and each downward movement releases the detent 67 from that dog, in each case causing the shaft 111 to make a half revolution. In this case, however, using a half revolution device instead of a full revolution device, the ratio of gearing upon the shaft 111 and the cam shaft 104 should be 2 to 1, so as to impart a complete rotation to the cam shaft 104 for each half rotation of the shaft 111. Thus a single tappet 119 should be employed on the controlling disk A so as to allow one complete rotation of the cam shaft 104 for each piece of work completed, assuming this to correspond with a single rotation of the control shaft 65. Obviously, however this arrangement may be modified, using different cam contours and a suitable number of tappets according to the number and character of the movements required for each piece of work completed. By this arrangement, each rotation of the cam shaft 104 operates through the cams 105 and 106 to rock the yoke 32, thereby moving the chuck operating sleeve and collar 31 to open the chuck. Then, after the stock is fed forward the yoke 32 is rocked back again to close the chuck upon the stock.

The mechanism for feeding the rod of stock forward through the chuck or collet while the latter is opened being so directly related to the chuck opening and closing movements is hereby shown to be controlled as to the time of its operations by the same control mechanism employed for timing the opening and closing movements of the chuck; and is also in part driven by the same driving mechanism. The shaft 104 has fixed upon its end the crank plate 124, the face of which is slotted to receive a crank pin 125, which may be clamped at any suitable radial distance from the center of rotation of the crank plate to impart the desired amplitude of movement. The crank pin engages with a slot 126 of a slotted lever 127, which is pivoted at 128 to the bed or frame, and at its upper end is pivotally connected by the pitman 129 to the slide 34, the upper end of which is connected by means of a hinged dog 36 to the grooved collar 37 of the feed tube 33. That tube may be of the ordinary construction, in which the forward end is split and yieldingly clamps the rod with sufficient friction to push it forward through the open chuck, but yields enough to slide over the rod as the tube is drawn backwardly after the rod has been gripped by the chuck. The amplitude of the forward and back movements, suited to the length of stock to be fed at each movement, is determined by adjusting the crank pin 125 in its slot in the crank plate 124 at a suitable radial distance from the center of rotation of that crank plate and the time of its movement is determined by the control apparatus already described, the forward feeding movement of the rod taking place while the chuck is in its open condition.

The chuck devices operated through the collar 31 by the yoke 32 may be of any well-known form. In some forms the chuck is closed by pushing its operating sleeve and collar corresponding to the collar 31, forwardly. In other forms it is closed by movement in the opposite direction, these various forms being well-known and understood.

I claim as my invention:—

1. The combination, in a screw machine, of a chuck carrying spindle, and chuck operating mechanism, including a plurality of cams disposed on an axis substantially at right angles with that of the chuck carrying spindle, and a chuck operating yoke provided with a plurality of cam arms extending on opposite sides of and engaging with the respective cams.

2. The combination, in a screw machine, of a chuck carrying spindle for the work, and chuck operating mechanism comprising a plurality of cams journaled below and substantially at right angles with the said spindle, a chuck operating yoke journaled on an axis substantially parallel with that of the cams and provided with a plurality of arms extending on opposite sides of and engaging with the said cams.

3. The combination, in a screw machine, of a work carrying spindle, and combined chuck operating and work feeding mechanisms for the spindle, including a shaft journaled substantially at right angles with the said spindle, cam devices on said shaft, a chuck operating yoke engaging with the said cam devices, a crank plate carried by the said shaft, a swinging work feeding lever mounted to oscillate alongside of the crank plate, and a revolving crank pin carried by the plate and engaging with the said feeding lever.

4. The combination, in a screw machine, of a work carrying spindle, and combined chuck operating and work feeding mechanism, including a shaft journaled substantially at right angles with the said spindle, a plurality of cams on said shaft, a chuck operating yoke provided with arms extending on opposite sides of and engaging with the said cams, a crank plate carried by the said shaft, a work feeding lever pivoted adjacent to and extending alongside of the crank plate, and a crank pin revolving with the plate and engaging with the said work feeding lever.

5. The combination, in a screw machine, of a work carrying spindle, and combined chuck operating and work feeding mechanism for the spindle, including a shaft journaled substantially at right angles with the said spindle, a plurality of cams on said shaft, a chuck operating yoke pivotally mounted on an axis parallel with the said shaft and provided with arms extending on opposite sides of and engaging with the respective cams, a slotted crank plate carried by the shaft, a slotted work feeding lever mounted to swing on an axis parallel with said shaft, and extending alongside of the crank plate, and an adjustable crank pin carried by the slotted crank plate and engaging in the slot of the work feeding lever.

6. The combination, in a screw machine, of a swinging yoke for operating the chuck, provided with a plurality of cam arms, a cam engaging with one of the arms to positively swing the yoke in one direction and another cam engaging with the other arm to swing the yoke in the opposite direction, and means for intermittently revolving the cams, the contours of the respective cams being formed to permit of the full swinging movement of the yoke at the intermissions in their revolutions.

7. The combination, in a screw machine, of chuck operating mechanism, including a swinging yoke provided with a plurality of cam arms, and a plurality of cams for engaging said arms, and means for intermittently revolving the cams, the contours of the cams being adapted to swing the yoke positively by their revolving movement, and to leave the yoke free to be moved manually when the cams are stationary.

8. The combination, in a screw machine, of chuck operating mechanism, including a swinging yoke for opening and closing the chuck, a plurality of independent cams for engaging the yoke to operate it positively in both directions, intermittent driving mechanism for driving the cams, and adjustable control devices driven with the machine for controlling the intermittent movements of the mechanism.

9. The combination, in a screw machine, of chuck operating mechanism, including a swinging yoke and a plurality of independent cams for engaging the yoke to positively open and close the chuck, and mechanism for intermittently imparting complete rotations to the cams, including a rotating driver, and means for transmitting and converting half rotations of the said driver into complete rotations of the said cams.

10. The combination, in a screw machine, of chuck operating mechanism, including a swinging yoke, a plurality of independent cams engaging said yoke to positively open and close the chuck, and means for imparting single revolutions to the said cams, including a rotating driver, a partial revolution clutch and connecting gearing for converting each partial revolution of the clutch into a complete revolution of the said cams.

11. The combination, with a screw machine, of chuck mechanism, stock feeding mechanism for the chuck, including a stock gripping device, a lever connected to said stock gripping device, a crank engaging with said lever, and mechanism for imparting intermittent single revolutions to said crank.

12. The combination, with a screw machine, of chuck mechanism, a stock gripping device, and mechanism for operating it in coöperation with the chuck mechanism, including a pivotally supported lever connected to said stock gripping device, a revolving driving crank working in a slot extending longitudinally of the lever, and means for imparting intermittent single revolutions to the said crank.

13. The combination, with a screw machine, of chuck mechanism, a stock gripping device, and mechanism for operating the said device in coöperation with the chuck mechanism, including a lever pivoted at one end, and connected at its other end to the said stock gripping device, a slot disposed in a radial relation to the pivot of the lever, a crank engaging in said slot, and means for imparting intermittent single revolutions to the crank.

14. The combination, with a screw machine, of chuck mechanism, stock gripping devices, and mechanism for moving the said devices back and forth to feed the stock forward in coöperation with the chuck movements, including a swinging lever pivotally mounted at one end and connected at its other end to the said stock gripping device, a slot extending lengthwise of the lever in a radial relation to its pivot, a crank engaging in said slot, and means for imparting intermittent single revolutions to the crank.

15. The combination, with a screw machine, of chuck mechanism, stock feeding mechanism coöperating with the chuck mechanism, including a stock gripping device, a pivotally supported lever connected with the stock gripping device, a crank operatively connected with the said lever, and means for imparting intermittent single revolutions to the crank, including a partial revolution clutch, and gearing for transmitting and converting the half revolutions of the said clutch into whole revolutions of the crank.

16. The combination, in a screw machine, of chuck mechanism, stock feeding mechanism coöperating with the chuck mechanism, including a stock gripping device, a pivotally supported lever connected with the stock feeding device, a crank engaging with said lever, means for imparting intermittent single revolutions to the crank, and adjustable control devices for governing the said intermittent action.

17. The combination, in a screw machine, of work feeding and holding mechanism, including chuck operating means, a stock gripping device, a pivotally supported lever connected with the said device, a crank engaging with the said lever, means for imparting intermittent single revolutions to the crank, and unitary control devices for correlating the movements of the machine, including a special control device for governing the intermittent action of the stock feed mechanism.

18. The combination, in a screw machine, of stock holding and feeding mechanism, including a chuck and its operating devices, a stock gripping device, a pivotally supported lever connected with said device, a crank pin engaging with the said lever, and a crank plate in which said crank pin is mounted for radial adjustment.

19. The combination, in a screw machine, of stock holding and feeding mechanism, including a chuck and its operating devices, a stock gripping device, including a swinging lever provided with a radially disposed slot, a crank pin engaging in said slot, and a radially slotted crank plate in which the said pin is adjustably fastened for varying the amplitude of the stock feeding movement.

20. The combination, in a screw machine, of coöperating chuck operating and stock feeding mechanism, including a chuck operating yoke, a plurality of independent cams for positively operating the yoke, a stock gripping device, a crank arranged to revolve with said cams, operative connection between the crank and the stock gripping device, and mechanism for imparting intermittent revolutions to the cams and the crank.

21. The combination, in a screw machine, of combined chuck and stock feed mechanism, including a swinging yoke for operating the chuck, a plurality of independent cams for positively operating the yoke, a pivotally supported stock feed lever, a crank engaging with said lever, and means for imparting intermittent single revolutions to the said cams and the said crank.

22. The combination, in a screw machine, of combined chuck operating mechanism, including a chuck operating yoke, a plurality of independent cams for positively operating the yoke, a stock gripping device, a crank arranged to revolve with said cams, operative connection with the crank and the stock gripping device, mechanism for imparting intermittent revolutions to the cam and the crank, and unitary control devices for the machine, including a special control device for governing the intermittent action of the combined chuck and stock feed mechanisms.

23. The combination, in a screw machine, of coöperating stock feeding and gripping mechanism, including a chuck operating yoke, a plurality of independent cams for positively operating the yoke, a pivotally supported stock feed lever, a crank plate, and an adjustable crank pin thereon for engaging the said lever, and means for concurrently imparting intermittent single revolutions to the said cam and to the said crank.

In testimony whereof I have signed my name to this specification in the presence of two subscribing witnesses this 21st day of April, 1914.

BENGT M. W. HANSON.

Witnesses:
KATHRYN T. M. O'CONNELL,
CAROLINE M. BRECKLE.